(12) United States Patent
Ballard et al.

(10) Patent No.: US 9,485,236 B2
(45) Date of Patent: Nov. 1, 2016

(54) SYSTEM AND METHOD FOR VERIFIED SOCIAL NETWORK PROFILE

(71) Applicant: VerifyMe, Inc., New York, NY (US)

(72) Inventors: Claudio R. Ballard, Fort Lauderdale, FL (US); Sandy Fliderman, Albertson, NY (US)

(73) Assignee: VerifyMe, Inc., New York, NY (US)

( * ) Notice: Subject to any disclaimer, the term of this patent is extended or adjusted under 35 U.S.C. 154(b) by 0 days.

(21) Appl. No.: 14/079,513

(22) Filed: Nov. 13, 2013

(65) Prior Publication Data

US 2014/0137195 A1 May 15, 2014

Related U.S. Application Data

(60) Provisional application No. 61/726,567, filed on Nov. 14, 2012.

(51) Int. Cl.
G06F 7/04 (2006.01)
H04L 29/06 (2006.01)
H04L 12/58 (2006.01)

(52) U.S. Cl.
CPC .............. H04L 63/08 (2013.01); H04L 51/00 (2013.01); H04L 51/32 (2013.01); H04L 63/0823 (2013.01); H04L 63/105 (2013.01); H04L 51/28 (2013.01); H04L 51/30 (2013.01)

(58) Field of Classification Search
CPC . H04L 63/08; H04L 63/0823; H04L 63/105; H04L 51/00; H04L 51/043
USPC .......................................................... 726/3
See application file for complete search history.

(56) References Cited

U.S. PATENT DOCUMENTS

| | | |
|---|---|---|
| 3,259,684 A | 7/1966 | Wakefield |
| 3,795,760 A | 3/1974 | Raw et al. |
| 3,908,959 A | 9/1975 | Fichtner |
| 4,733,361 A | 3/1988 | Krieser et al. |
| 4,845,416 A | 7/1989 | Scholl et al. |
| 5,149,915 A | 9/1992 | Brunker et al. |
| 5,156,198 A | 10/1992 | Hall |
| 5,195,092 A | 3/1993 | Wilson et al. |
| 5,416,777 A | 5/1995 | Kirkham |
| 5,519,588 A | 5/1996 | Sobeck et al. |
| 5,566,091 A | 10/1996 | Schricker et al. |
| 5,652,893 A | 7/1997 | Ben-Meir et al. |
| 5,704,586 A | 1/1998 | Nielsen |
| 5,953,844 A | 9/1999 | Harling et al. |
| 6,011,548 A | 1/2000 | Thacker |
| 6,044,857 A | 4/2000 | Stege |
| 6,182,807 B1 | 2/2001 | Saito et al. |
| 6,262,982 B1 | 7/2001 | Donahue et al. |
| 6,308,205 B1 | 10/2001 | Carcerano et al. |
| 6,311,106 B1 | 10/2001 | Dupont |
| 6,386,229 B1 | 5/2002 | Morikawa et al. |
| 6,438,472 B1 | 8/2002 | Tano et al. |
| 6,481,140 B1 | 11/2002 | Marshall |
| 6,487,804 B1 | 12/2002 | Petrella, Jr. |
| 6,533,466 B1 | 3/2003 | Smith |
| 6,564,661 B2 | 5/2003 | DeJonge |
| 6,609,051 B2 | 8/2003 | Fiechter et al. |

(Continued)

Primary Examiner — Ellen Tran
(74) Attorney, Agent, or Firm — Morrison & Foerster LLP

(57) ABSTRACT

A method for verifying the on-line identity of a subscribed user and securely displaying an indicia in connection with that user's on-line content, wherein the indicia includes an aspect corresponding to the verification level assigned to the subject user's profile.

10 Claims, 2 Drawing Sheets

(56) References Cited

U.S. PATENT DOCUMENTS

| Patent / Publication | Date | Inventor(s) | |
|---|---|---|---|
| 6,693,523 B1 | 2/2004 | Abel et al. | |
| 6,837,602 B1 | 1/2005 | Lee | |
| 6,859,539 B1 | 2/2005 | Maeda | |
| 7,004,787 B2 | 2/2006 | Milan | |
| 7,038,192 B2 | 5/2006 | Lu et al. | |
| 7,110,868 B2 | 9/2006 | An | |
| 7,270,263 B2 | 9/2007 | Rosenblatt | |
| 7,375,285 B2 | 5/2008 | Chiang | |
| 7,377,344 B2 | 5/2008 | Barske | |
| 7,392,122 B2 | 6/2008 | Pillar et al. | |
| 7,441,362 B1 | 10/2008 | Kley | |
| 7,483,952 B2 | 1/2009 | Light et al. | |
| 7,506,468 B2 | 3/2009 | Farrell et al. | |
| 7,519,558 B2 | 4/2009 | Ballard et al. | |
| 7,540,638 B2 | 6/2009 | Dassanayake et al. | |
| 7,620,212 B1 | 11/2009 | Allen et al. | |
| 7,703,961 B2 | 4/2010 | Yatsuda et al. | |
| 7,725,732 B1 | 5/2010 | Ballard | |
| 7,740,501 B2 | 6/2010 | Ballard et al. | |
| 7,747,739 B2 | 6/2010 | Bridges et al. | |
| 7,856,158 B2 | 12/2010 | Ballard | |
| 7,886,471 B2 | 2/2011 | Glock | |
| 7,921,588 B2 | 4/2011 | Brown et al. | |
| 7,940,673 B2 | 5/2011 | Ballard et al. | |
| 8,089,228 B2 | 1/2012 | Ballard | |
| 8,111,145 B2 | 2/2012 | Ballard | |
| 8,125,346 B2 | 2/2012 | Ballard et al. | |
| 8,254,734 B2 | 8/2012 | Ballard | |
| 8,303,337 B2 | 11/2012 | Ballard et al. | |
| 8,342,478 B1 | 1/2013 | Cordray et al. | |
| 8,526,311 B2 | 9/2013 | Ballard et al. | |
| 8,604,906 B1 | 12/2013 | Halferty et al. | |
| 8,850,733 B1 | 10/2014 | Oster | |
| 2001/0034671 A1 | 10/2001 | Luke et al. | |
| 2002/0034301 A1 | 3/2002 | Andersson | |
| 2002/0112390 A1 | 8/2002 | Harling et al. | |
| 2002/0180579 A1 | 12/2002 | Nagaoka et al. | |
| 2003/0114965 A1 | 6/2003 | Fiechter et al. | |
| 2003/0120397 A1 | 6/2003 | Bergmann et al. | |
| 2003/0158638 A1 | 8/2003 | Yakes et al. | |
| 2003/0191564 A1 | 10/2003 | Haugse et al. | |
| 2003/0216889 A1 | 11/2003 | Marko et al. | |
| 2004/0019413 A1 | 1/2004 | Bonilla | |
| 2004/0031180 A1 | 2/2004 | Ivanov | |
| 2004/0043753 A1 | 3/2004 | Wake et al. | |
| 2004/0159289 A1 | 8/2004 | Taylor et al. | |
| 2004/0202007 A1 | 10/2004 | Yagi et al. | |
| 2004/0211246 A1 | 10/2004 | Han et al. | |
| 2004/0252867 A1 | 12/2004 | Lan et al. | |
| 2005/0107928 A1 | 5/2005 | Mueller | |
| 2005/0109145 A1 | 5/2005 | Levin et al. | |
| 2005/0132194 A1 | 6/2005 | Ward | |
| 2005/0137796 A1 | 6/2005 | Gumpinger | |
| 2005/0155043 A1 | 7/2005 | Schulz et al. | |
| 2005/0190045 A1 | 9/2005 | Lesesky et al. | |
| 2005/0240484 A1 | 10/2005 | Yan et al. | |
| 2006/0044825 A1 | 3/2006 | Sa | |
| 2006/0200781 A1 | 9/2006 | Obradovich | |
| 2007/0001830 A1 | 1/2007 | Dagci et al. | |
| 2007/0011227 A1 | 1/2007 | Johnson | |
| 2007/0030137 A1 | 2/2007 | Masters et al. | |
| 2007/0204039 A1 | 8/2007 | Inamdar | |
| 2007/0252681 A1 | 11/2007 | Costello et al. | |
| 2008/0060861 A1 | 3/2008 | Baur et al. | |
| 2008/0109244 A1* | 5/2008 | Gupta | 705/1 |
| 2008/0189768 A1* | 8/2008 | Callahan et al. | 726/4 |
| 2008/0257428 A1 | 10/2008 | Scholz et al. | |
| 2009/0040029 A1 | 2/2009 | Bridges et al. | |
| 2009/0051522 A1 | 2/2009 | Perkins | |
| 2009/0091291 A1 | 4/2009 | Woody et al. | |
| 2009/0200988 A1 | 8/2009 | Bridges et al. | |
| 2009/0204510 A1 | 8/2009 | Hwang | |
| 2009/0272313 A1 | 11/2009 | Ballard et al. | |
| 2009/0273282 A1 | 11/2009 | Ballard et al. | |
| 2009/0273942 A1 | 11/2009 | Ballard et al. | |
| 2009/0289757 A1 | 11/2009 | Ballard | |
| 2010/0076673 A1 | 3/2010 | Saloka | |
| 2010/0082277 A1 | 4/2010 | Ballard | |
| 2010/0126401 A1 | 5/2010 | Kokkinis | |
| 2010/0155635 A1 | 6/2010 | Fima | |
| 2010/0208915 A1 | 8/2010 | Lipp | |
| 2011/0010269 A1 | 1/2011 | Ballard | |
| 2011/0202205 A1 | 8/2011 | Pepitone et al. | |
| 2011/0320849 A1 | 12/2011 | Cochran et al. | |
| 2012/0010924 A1* | 1/2012 | Piliouras | 705/7.32 |
| 2012/0083958 A1 | 4/2012 | Ballard | |
| 2012/0114189 A1* | 5/2012 | Lee | 382/115 |
| 2012/0179620 A1 | 7/2012 | Fliderman et al. | |
| 2012/0204032 A1* | 8/2012 | Wilkins et al. | 713/170 |
| 2013/0058012 A1 | 3/2013 | Ballard | |
| 2013/0173940 A1 | 7/2013 | Sargent et al. | |
| 2013/0231794 A1 | 9/2013 | Fick et al. | |
| 2014/0020244 A1 | 1/2014 | Carlson et al. | |
| 2014/0133715 A1 | 5/2014 | Ballard et al. | |
| 2014/0137195 A1 | 5/2014 | Ballard et al. | |
| 2014/0140587 A1 | 5/2014 | Ballard et al. | |
| 2014/0166694 A1 | 6/2014 | Otto | |
| 2014/0193140 A1 | 7/2014 | Fliderman et al. | |
| 2014/0195974 A1 | 7/2014 | Ballard et al. | |
| 2014/0196143 A1 | 7/2014 | Fliderman et al. | |
| 2014/0205196 A1 | 7/2014 | Freedman et al. | |
| 2014/0209825 A1 | 7/2014 | Fick et al. | |
| 2014/0222976 A1 | 8/2014 | Ballard et al. | |
| 2014/0243081 A1 | 8/2014 | Fliderman | |
| 2014/0244051 A1 | 8/2014 | Rollins et al. | |
| 2014/0303808 A1 | 10/2014 | Sargent | |
| 2014/0306837 A1 | 10/2014 | Hauck, III | |
| 2015/0040453 A1 | 2/2015 | Ballard et al. | |

* cited by examiner

SYSTEM AND METHOD FOR VERIFIED SOCIAL NETWORK PROFILE

CROSS-REFERENCE TO RELATED APPLICATIONS

This application claims benefit of U.S. Provisional Application No. 61/726,567, filed Nov. 14, 2012, entitled SYSTEM AND METHOD FOR VERIFIED SOCIAL NETWORK PROFILE, the specification of which is incorporated by reference herein in its entirety.

TECHNICAL FIELD

The following disclosure relates to methods for on-line identity verification and management. More specifically, it relates to methods for verifying the identity of a user and associating with that user's on-line presence secure indicia that are indicative of the level of identity verification.

BACKGROUND

There currently exist prolific problems arising from anonymous and/or proxy users of blogs, social networks, media and general websites' author and/or comments sections. Further, there is an on-line epidemic of identity thefts, fraud, threats, slander, defamation, bullying, impersonations, etc., by anonymous or fraudulent "authors," of blogs, profiles on Facebook (or similar social network sites), published articles, references, users, "sellers" and "commentors." A need therefore exists, for improved methods to verify the identity of on-line users.

It is known that selected social network sites and other on-line sites (i.e., "platforms") utilize vetting of one type or another to verify the identity of their users. However, the results of such verification efforts are typically applicable only to that platform. A need therefore exists, for verification methods that are applicable across multiple platforms, and a further need for corresponding indicia that are recognized across multiple platforms.

U.S. Pat. No. 7,519,558 to Ballard et al. describes certain technology relating to identity verification. U.S. Pat. No. 7,519,558, including all specification, description, figures and claims, is hereby incorporated by reference.

SUMMARY

In one aspect thereof, an electronic watermark (e.g., similar to a notary seal) is created that identifies to users everywhere and across multiple platforms that the profile of this author, user, commentor or seller has been verified using the system's unique verification technique (method). In preferred embodiments, those verified profiles displaying the subject electronic watermark continue to be monitored and authenticated by the system for the purposes of mitigating the identity-related problems that routinely arise in today's cyber web environment.

This invention utilizes a unique and novel approach to electronic watermarking for the purposes of personal and/or corporate identity management. In preferred embodiments, this electronic watermark also displays a level of confidence by a visual representation of the watermark with various colors or graphical rendering. The system's verification method incorporates and/or accommodates known information obtained through the verification process such as frequency of use, known and trusted devices, geographical location, etc.

In another aspect, a logo (graphical indicia) is provided as the electronic watermark and displayed with graduated colors from a first color (e.g., red) thru the spectrum to a final color (e.g., green), wherein the position along the color spectrum from the first color to the second color represents the level of screening/verification that a particular user's profile has gone through. The color or other aspect of the logo may represent whether the particular user still subscribes to the service. This rendering of watermark corresponds with the concept of a "Trust Score" as explained in U.S. Pat. No. 7,519,558 to Ballard et al.

In yet another aspect, a method is provided for verifying the on-line identity of a subscribed user and securely displaying an indicia in connection with that user's on-line content, wherein the indicia includes an aspect corresponding to the verification level assigned to the subject user's profile, in accordance with the disclosure herein

BRIEF DESCRIPTION OF THE DRAWINGS

For a more complete understanding, reference is now made to the following description taken in conjunction with the accompanying Drawings in which.

DETAILED DESCRIPTION

Figure 1:
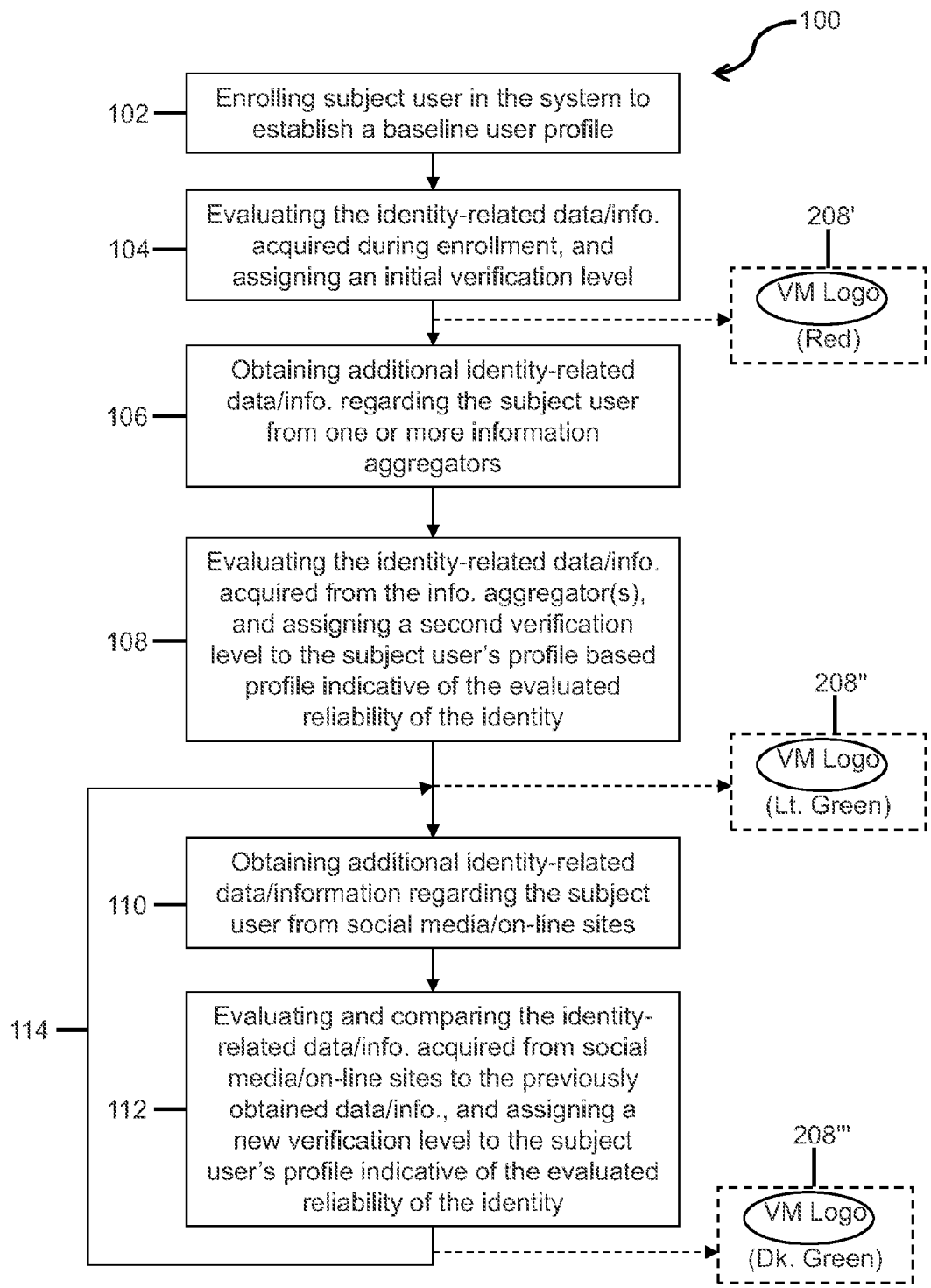
FIG. 1 is a flow diagram of a method for on-line identity verification in accordance with one embodiment.

Referring now to FIG. 1, in one aspect, the system 100 comprises a method of verifying the on-line identity of subscribed users, comprising the following steps:

1) Enrolling the subject user in the system to establish a baseline user profile (a minimum of one verifiably unique identifier is required; however, the identifier typically does not need to be verified as accurate, merely unique) (block 102; FIG. 1);

2) Evaluating the identity-related data/information acquired during enrollment, and assigning an initial verification level to the subject user's profile indicative of the evaluated reliability of the identity (block 104; FIG. 1);

3) Obtaining additional identity-related data/information regarding the subject user from one or more information aggregators (e.g., Dunn & Bradstreet, Better Business Bureau, etc.) (block 106; FIG. 1);

4) Evaluating the identity-related data/information acquired from the information aggregator(s), and assigning a second verification level to the subject user's profile indicative of the evaluated reliability of the identity (block 108; FIG. 1);

5) Obtaining additional identity-related data/information regarding the subject user from social media sites and other on-line sites (including, but not limited to: photographs tagged as subject user; on-line writings, blogs, comments, sales, comments, etc,. attributed to subject user; known and trusted device information relating to subject user; geographic information; frequency of user information) (block 110; FIG. 1);

6) Evaluating and comparing the identity-related data/information acquired from the social media and other on-line sites to the previously obtained data/information, and assigning a new verification level to the subject user's profile indicative of the evaluated reliability of the identity (block 112; FIG. 1); and 7) Periodically repeating steps 5 and 6 as necessary to continuously acquire additional identity-related data/information, evaluate and compare the newly acquired data/information and assign new verification levels to the subject user's profile (line 114; FIG. 1).

Figure 2:
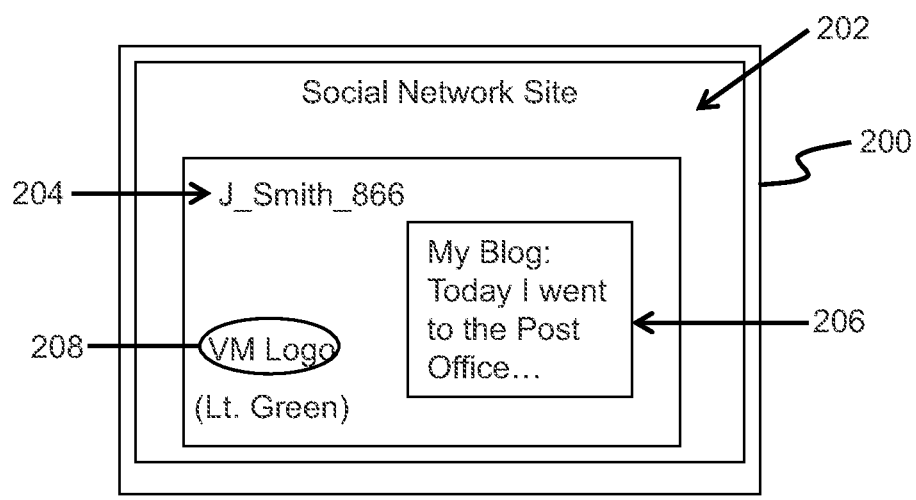
FIG. 2 shows an on-line page for a social media site (displayed on a device screen) including a secure indicia associated with a user's profile that is indicative of the level of identity verification for that user.

Referring now to FIG. 2, there is illustrated a secure indicia associated with a user's on-line profile that is indicative of the level of identity verification for that user in accordance with another aspect. FIG. 2 shows a device screen 200 displaying a page 202 from a typical social media site. The page 202 includes the user name 204 and user content 206, in this case, a blog. Also provided on the page 202 is one or more secure indicia 208 associated with the user's profile that is indicative of the level of identity verification for that user. The security of the indicia itself is handled in a conventional manner (e.g., by electronic security certificate) by the provider of the social network site and the provider of the verification system. For purposes of illustration, the indicia 208 in the illustrated embodiment includes the text "VM Logo" and an elliptical design; however, any desired text and/or logo could be used.

The indicia 208 further includes an aspect that can be incrementally varied across a range from a first value (e.g., lowest) to a second value (e.g., highest) to indicate the degree of confidence attributed to the identity verification of the subject user's profile. In the illustrated case, the variable aspect is a color, which ranges from red (lowest confidence) to green (highest confidence). For purposes of illustration in FIG. 2, the "color" of the indicia is indicated by the wording "Lt. Green" (i.e., light green); however, it will be understood that the wording may not be present on the actual indicia, only the color. In other embodiments, other ranges of attributes can be used including, but not limited to, numbers, graduated sizes, progressive symbols, etc.

Referring now again to FIG. 1, the use of the verification system 100 to generate continuously updated indicia 208 indicative of the level of identity verification for a user's profile is shown. In FIG. 1, examples of the indicia 208 that would be generated by the system and securely associated with the user's on-line profile at various times are shown. For example, after initial enrollment (block 104), the user's profile may be associated with a "red" indicia 208' indicating a low level of verification. After additional information is received from the data aggregators and evaluated (block 108) (assuming no adverse results), the user's profile may be associated with a "light green" indicia 208'' indicating a medium level of verification. After still more information is received from social media/on-line sites and evaluated (block 112) (again assuming no adverse results), the user's profile may be associated with a "green" indicia 208''' indicating the highest level of verification. Of course, if adverse information is received, the indicia color may be reduced instead of increased.

Although the preferred embodiment has been described in detail, it should be understood that various changes, substitutions and alterations can be made therein without departing from the spirit and scope of the invention as defined by the appended claims.

What is claimed is:

1. A method for verifying the on-line identity of subscribed users for a system, comprising the following steps:

a) enrolling the subject user in the system to establish a baseline user profile including a first set of identity-related data/information and at least one verifiably unique identifier;

b) evaluating the first set of identity-related data/information acquired from the subject user during enrollment, and assigning an initial verification level to the user profile of the subject user indicative of the evaluated reliability of the on-line identity of the subject user based on the evaluation of the first set of identity-related data/information;

c) after step (b) is performed, obtaining a second set of identity-related data/information regarding the subject user from one or more information aggregators that are associated with the system;

d) evaluating the second set of identity-related data/information acquired from the information aggregator(s), and assigning a second verification level to the user profile of the subject user indicative of the evaluated reliability of the on-line identity of the subject user based on the evaluations of the first and second sets of identity-related data/information;

e) after step (d) is performed, obtaining a third set of identity-related data/information regarding the subject user from social media sites that are not associated with the system;

f) evaluating and comparing the third set of identity-related data/information acquired from the social media sites to the previously obtained first and second sets of identity-related data/information, and assigning a third verification level to the user profile of the subject user indicative of the evaluated reliability of the identity of the subject user based on a comparison of the third set of identity-related data/information to the previously obtained first and second sets of identity-related data/information; and g) periodically repeating steps e) and f) to continuously acquire updates to the third set of identity-related data/information, evaluate and compare the updated third set of identify-related data/information and assign an updated third verification level to the user profile of the subject user.

2. The method in accordance with claim 1, further comprising the following steps:

selecting a non-numeric aspect from an incremental range of non-numeric aspects between a first non-numeric value and a second non-numeric value, where the value of the selected non-numeric aspect corresponds to the verification level assigned to the subject user's profile; and displaying an indicia on a website along with content submitted by the subject user, wherein the indicia includes the selected non-numeric aspect corresponding to the verification level assigned to the subject user's profile.

3. The method in accordance with claim 2, wherein the displaying of the indicia is performed in conjunction with security measures to ensure authenticity of the indicia.

4. The method in accordance with claim 2, wherein the range of non-numeric aspects is a range of colors.

5. The method in accordance with claim 4, wherein the range of colors ranges from red, denoting lowest confidence, to green, denoting highest confidence.

6. The method in accordance with claim 1, wherein:

the step of obtaining the third set of identity-related data/information regarding the subject user from social media sites includes obtaining photographs tagged as the subject user from social media sites; and the step of evaluating and comparing the third set of identity-related data/information includes comparing the photographs tagged as the subject user to the previously obtained sets of identity-related data/information.

7. The method in accordance with claim 1, wherein:

the step of obtaining the third set of identity-related data/information regarding the subject user from social media sites includes obtaining on-line writings, blogs, comments, sales or comments attributed to the subject user from social media sites; and the step of evaluating and comparing the third set of identity-related data/information includes comparing the on-line writings, blogs, comments, sales or comments attributed to the subject user to the previously obtained sets of identity-related data/information.

8. The method in accordance with claim 1, wherein:

the step of obtaining the third set of identity-related data/information regarding the subject user from social media sites includes obtaining known and trusted device information relating to the subject user from social media sites; and the step of evaluating and comparing the third set of identity-related data/information includes comparing the known and trusted device information relating to the subject user to the previously obtained sets of identity-related data/information.

9. The method in accordance with claim 1, wherein:

the step of obtaining the third set of identity-related data/information regarding the subject user from social media sites includes obtaining geographic information relating to the subject user from social media sites; and the step of evaluating and comparing the third set of identity-related data/information includes comparing the geographic information relating to the subject user to the previously obtained sets of identity-related data/information.

10. The method in accordance with claim 1, wherein:

the step of obtaining the third set of identity-related data/information regarding the subject user from social media sites includes obtaining frequency of user information relating to the subject user from social media sites; and the step of evaluating and comparing the third set of identity-related data/information includes comparing the frequency of user information relating to the subject user to the previously obtained sets of identity-related data/information.

\* \* \* \* \*